US006622917B1

(12) United States Patent
Knowles

(10) Patent No.: US 6,622,917 B1
(45) Date of Patent: *Sep. 23, 2003

(54) SYSTEM AND METHOD FOR COMPOSING SETS OF URL-ENCODED BAR CODE SYMBOLS WHILE USING AN INTERNET BROWSER PROGRAM

(75) Inventor: C. Harry Knowles, Morristown, NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/506,947

(22) Filed: Feb. 18, 2000

Related U.S. Application Data

(63) Continuation of application No. 08/820,540, filed on Mar. 19, 1997, and a continuation-in-part of application No. 08/753,367, filed on Nov. 25, 1996, now abandoned, which is a continuation-in-part of application No. 08/645,331, filed on May 13, 1996, now Pat. No. 5,844,227, and a continuation-in-part of application No. 08/615,054, filed on Mar. 12, 1996, and a continuation-in-part of application No. 08/584,135, filed on Jan. 11, 1996, now Pat. No. 5,616,908, and a continuation-in-part of application No. 08/573,949, filed on Dec. 18, 1995, now abandoned, and a continuation-in-part of application No. 08/561,479, filed on Nov. 20, 1995, now Pat. No. 5,661,292, and a continuation-in-part of application No. 08/489,305, filed on Jun. 9, 1995, now abandoned, and a continuation-in-part of application No. 08/476,069, filed on Jun. 7, 1995, now Pat. No. 5,591,953, and a continuation-in-part of application No. 08/293,493, filed on Aug. 19, 1994, now Pat. No. 5,525,789, and a continuation-in-part of application No. 08/292,237, filed on Aug. 17, 1994, now Pat. No. 5,808,285, and a continuation-in-part of application No. 08/278,109, filed on Nov. 24, 1993, now Pat. No. 5,484,992, and a continuation-in-part of application No. 08/365,193, filed on Dec. 28, 1994, now Pat. No. 5,557,093.

(51) Int. Cl.[7] .............................................. G06K 7/10
(52) U.S. Cl. .............................. 235/462.01; 235/462.15
(58) Field of Search ....................... 235/462.01, 472.01; 705/28, 14

(56) References Cited

U.S. PATENT DOCUMENTS 4,654,482 A    3/1987   DeAngelis (List continued on next page.)

FOREIGN PATENT DOCUMENTS

EP    0 645 728 A2    3/1995    ............ G06K/7/10

(List continued on next page.)

OTHER PUBLICATIONS

U.S. patent application Ser. No. 08/691,263, Swift et al., filed Jan. 1, 2000.

Primary Examiner—Michael G. Lee
Assistant Examiner—Ahshik Kim
(74) Attorney, Agent, or Firm—Thomas J. Perkowski, Esq., P.C.

(57) ABSTRACT

A novel system and method of surfing Web-sites on the Internet and for composing and printing lists and sets of URL-encoded bar code symbols representing Web-sites within the WWW. In the first illustrative embodiment, the Internet Scanning System includes a bar code symbol reader programmed to read URL-encoded bar code symbols printed on various types of print media which, when read thereby, automatically connect the Internet Client System to the Internet Server supporting the Web-site specified by the scanned URL-encoded bar code symbol. In a second illustrative embodiment, the Internet Scanning system includes optical character reader programmed to read URLs printed on various types of print media which, when read thereby, automatically connect the Internet Client System to the Internet Server supporting the Web-site specified by the read URL.

16 Claims, 9 Drawing Sheets

U.S. PATENT DOCUMENTS

| | | |
|---|---|---|
| 4,841,132 A | 6/1989 | Kajitani et al. |
| 5,280,498 A | 1/1994 | Tymes et al. |
| 5,288,976 A | 2/1994 | Citron et al. |
| 5,448,046 A | 9/1995 | Swartz |
| 5,483,052 A | 1/1996 | Smith, III et al. |
| 5,490,217 A | 2/1996 | Wang et al. |
| 5,506,697 A | 4/1996 | Li et al. |
| 5,600,833 A | 2/1997 | Senn et al. |
| 5,635,694 A | 6/1997 | Tuhro |
| 5,640,193 A | 6/1997 | Wellner |
| 5,692,073 A | 11/1997 | Cass |
| 5,804,803 A | 9/1998 | Cragun et al. |
| 5,825,002 A | 10/1998 | Roslak |
| 5,869,819 A | 2/1999 | Knowles et al. |
| 5,902,353 A | 5/1999 | Reber et al. |
| 5,903,729 A | 5/1999 | Reber et al. |
| 5,905,248 A | 5/1999 | Russell et al. |
| 5,905,251 A | 5/1999 | Knowles |
| 5,918,213 A | 6/1999 | Bernard et al. |
| 5,918,214 A | 6/1999 | Perkowski |
| 5,930,767 A | 7/1999 | Reber et al. |
| 5,933,829 A | 8/1999 | Durst et al. |
| 5,938,726 A | 8/1999 | Reber et al. |
| 5,940,595 A | 8/1999 | Reber et al. |
| 5,950,173 A | 9/1999 | Perkowski |
| 5,971,277 A | 10/1999 | Cragun et al. |
| 5,978,773 A | 11/1999 | Hudetz et al. |
| 5,979,757 A | 11/1999 | Tracy et al. |
| 5,986,651 A | 11/1999 | Reber et al. |
| 5,992,752 A | 11/1999 | Wilz, Sr. et al. |
| 5,995,105 A | 11/1999 | Reber et al. |
| 6,012,102 A * | 1/2000 | Shachar .......................... 710/5 |
| 6,027,024 A | 2/2000 | Knowles |
| 6,032,195 A | 2/2000 | Reber et al. |
| 6,045,048 A * | 4/2000 | Wilz, Sr. et al. ........ 235/472.01 |
| 6,064,979 A | 5/2000 | Perkowski |
| 6,068,188 A * | 5/2000 | Knowles ................ 235/462.01 |
| 6,076,733 A * | 6/2000 | Wilz, Sr. et al. ........ 235/462.01 |
| 6,081,827 A | 6/2000 | Reber et al. |
| 6,108,656 A | 8/2000 | Durst et al. |
| 6,138,151 A | 10/2000 | Reber et al. |
| 6,199,048 B1 | 3/2001 | Hudetz et al. |

FOREIGN PATENT DOCUMENTS

| | | | | |
|---|---|---|---|---|
| EP | 0 744 856 A2 | 11/1996 | ............ | H04M/3/42 |
| EP | 0 837 406 A2 | 4/1998 | | |
| EP | 856 812 A2 | 5/1998 | .......... | G06K/17/00 |
| WO | WO 97/01137 | 1/1997 | | |
| WO | WO 97/37319 | 10/1997 | | |
| WO | WO 98/03923 | 1/1998 | | |
| WO | WO 98/06055 | 2/1998 | | |
| WO | WO 98/09243 | 3/1998 | | |
| WO | WO 98/19259 | 5/1998 | | |
| WO | WO 98/20411 | 5/1998 | | |
| WO | WO 98/38761 | 9/1998 | | |
| WO | WO 98/51035 | 11/1998 | | |
| WO | WO 98/51036 | 11/1998 | | |
| WO | WO 98/51077 | 11/1998 | | |

OTHER PUBLICATIONS

AllPen Software Announces NetHopper at PC Expo by Press Release Allpen Software, et. al., www.allpen.com, vol. 0, No. 0, 1998, p. 1.

ZooWorks' automatic catalogs enable easy URL sharing by Gess Shankar, Intranet World, 1997.

Bookmarks by David Noack, Web Guide Magazine, 1997, p. 33–35.

NetHopper 2.0 The World in the Palm of Your Hands by product description (no author), LandWare, Inc., vol. 0, No. 0, 1997, p. 1–2.

Magazine Guides That Help the Surfers by John Burks, New York Times, vol. 0, No. 0, 1996, p. D7.

IRIS IRISPen by under Reviews/Scanners, MacUser, vol. 0, No. 0, 1996, p. 54–55.

World–Wide Web: The Information Universe by Tim Berners–Lee, et. al., Meckler Media, Westport CT, 1992.

PCT International Search Report, 1997.

* cited by examiner

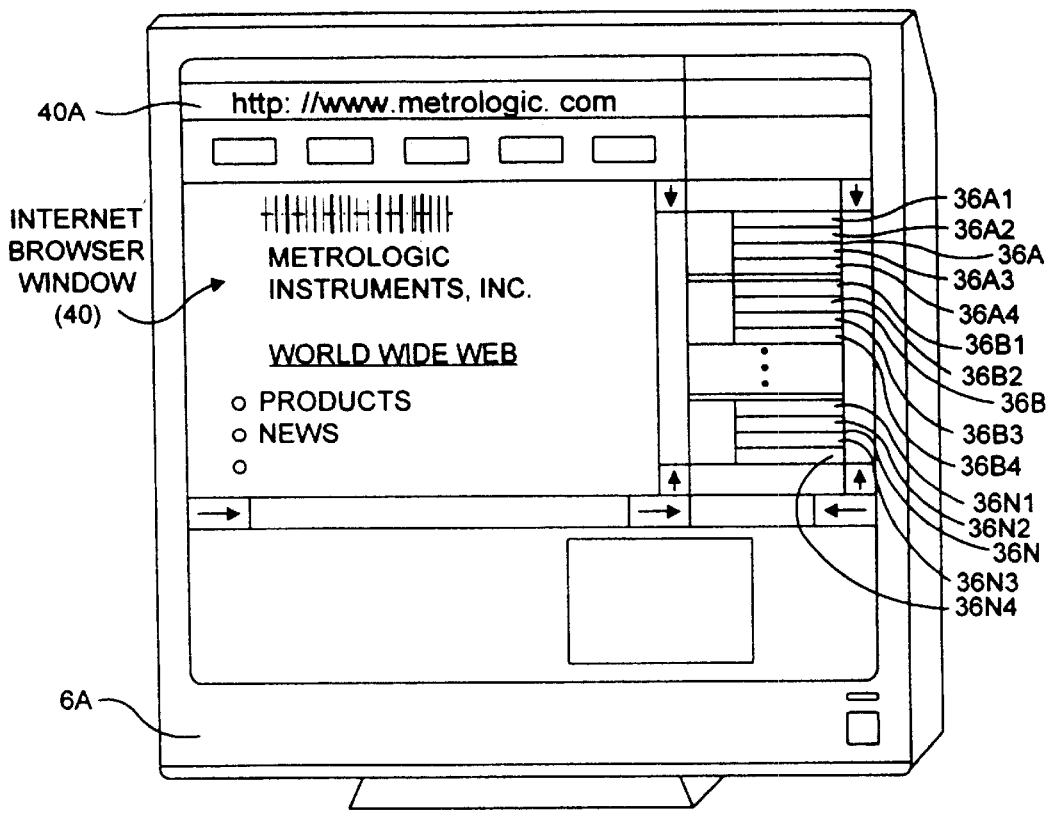
F I G. 4
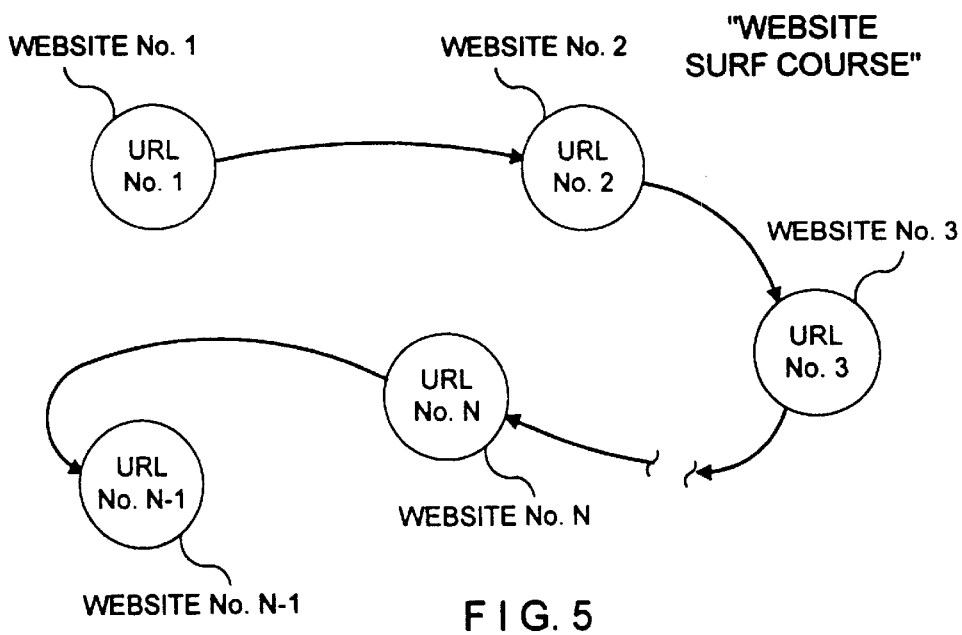
F I G. 5

SYSTEM AND METHOD FOR COMPOSING SETS OF URL-ENCODED BAR CODE SYMBOLS WHILE USING AN INTERNET BROWSER PROGRAM

RELATED CASES

This Application is a Continuation of copending application Ser. No. 08/820,540 filed Mar. 19, 1997 which is a Continuation-in-Part of: application Ser. No. 08/753,367 filed Nov. 25, 1996, now abandoned; application Ser. No. 08/645,331 filed May 13, 1996 now U.S. Pat. No. 5,844,223; application Ser. No. 08/615,054 filed Mar. 12, 1996; application Ser. No. 08/573,949 file Dec. 18, 1995, now abandoned; application Ser. No. 08/292,237 filed Aug. 17, 1994 now U.S. Pat. No. 5,808,285; application Ser. No. 08/365,193 filed Dec. 28, 1994, now U.S. Pat. No. 5,557,093; application Ser. No. 08/293,493 filed Aug. 19, 1994, now U.S. Pat. No. 5,525,789; application Ser. No. 08/561,479 filed Nov. 20, 1995, now U.S. Pat. No. 5,608,292; application. Ser. No. 08/278,109 filed Nov. 24, 1995, now U.S. Pat. No. 5,484,992; application Ser. No. 08/489,305 filed Jun. 9, 1995, now abandoned; Ser. No. 08/476,069 filed Jun. 7, 1995, now U.S. Pat. No. 5,591,953; and application Ser. No. 08/584,135 filed Jan. 11, 1996, now U.S. Pat. No. 5,616,908. Each said patent application is assigned to and commonly owned by Metrologic Instruments, Inc. of Blackwood, N.J., and is incorporated herein by reference in its entirety.

BACKGROUND OF INVENTION

1. Field Of Invention

The present invention is directed to a novel Internet scanning terminal, and method of surfing the Internet by scanning bar code symbols encoded with Uniform Resource Locators (URLs) indicating the location of information resources on the Internet to be explored, and also to a novel method of composing and printing lists and menus of URL-encoded bar code symbols identifying the location of such information resources on the Internet.

2. Background Of The Invention

Presently, several techniques have been developed for connecting to (i.e., "surfing" among) Internet-based information resources on the World Wide Web (WWW) using conventional graphical user interface (GUI) based Internet browser programs, such as the Navigator® from Netscape Communications, Inc. or the Internet Explorer® from Microsoft, Inc. The availability of any particular Web-site surfing technique depends on where the Internet user finds him or her self in the Internet browser program at any particular instant of time.

For example, if one is currently at a Web-site (i.e., in a particular HyperText Markup Language (HTML) document), at which there is a highlighted or embedded "link" specifying the Internet address of another Web-site (i.e., another HTML document), then the user can "surf to" this other Web-site by simply "clicking on" or selecting the highlighted URL with his or her pointing device (i.e., "mouse") in a conventional manner. The ability to connect to other Web-sites by simply pointing and clicking on a highlighted URLs embedded in an HTML document has contributed enormously to the growth and popularity of the Internet in the last few years.

If the user desires to connect to a Web-site that is not referenced in a HTML document viewed through a browser program, then the user oftentimes finds it necessary to manually enter the URL of the Web-site (e.g., "http://www.metrologic.com") into the browser program. This requires manually pressing a sequence of keys on a keyboard or remote control device, corresponding to the characters of the URL being selected. In addition to being time consuming, this Web-site surfing technique is prone to errors, causing the browser program to connect to the wrong Web-site or returns an error message stating that the Domain Name of the Web-site sought after cannot be found. From a practical point of view, this is quite frustrating to the Internet user.

More recently, with the growth and ever increasing complexity of the WWW, it is becoming popular to use printed publications (e.g., magazines, catalogues, directories, etc.) which list Web-sites, corresponding URLs and content descriptions, as navigational aids, much in the same way that the TV GUIDE® magazine is used to help viewers select programs during television viewing. Again, however, each time a listed Web-site is chosen to be viewed, the user is forced to manually enter into the Internet browser program, the lengthy character string associated with the URL of the Web-site being selected. Only thereafter, does the browser program automatically connect the user's client system (i.e., Internet Terminal) to the Internet Server computer supporting the selected Web-site.

While the development of HTML and GUI-based Web browser programs have made accessing Web-sites quite simple, the above shortcomings and drawbacks of prior art Internet technology clearly indicate a great need in the art for an improved system and method of surfing to Web-sites on the Internet.

OBJECTS AND SUMMARY OF THE PRESENT INVENTION

Accordingly, it is a primary object of the present invention to provide an improved method and apparatus for surfing among information resources on the Internet while avoiding the shortcomings and drawbacks of prior art systems and methodologies.

A further object of the present invention is to provide an Internet Scanning System which-includes a bar code symbol reader for reading URL-encoded bar code symbols printed on various types of print media which, when read thereby, automatically connects the Internet Scanning System to the Internet Server that contains the information resource specified by the scanned URL-encoded bar code symbol.

A further object of the present invention is to provide such an Internet Scanning System, wherein the bar code symbol reader may be a laser scanning bar code symbol reader, a CCD bar code symbol reader, or a Wand-type bar code symbol reader.

A further object of the present invention is to provide such an Internet Scanning System, wherein the URL-encoded bar code symbol printed on various types of print media is a URL-encoded truncated-type bar code symbol, having a very low height to length ratio, thereby allowing many URL-encoded bar code symbols to be printed on a single sheet or page of a Web-site guide, along with their corresponding human-readable URLs and content descriptions.

Another object of the present invention is to provide such an Internet Scanning System in the form of a desktop, laptop or palmtop computer system that is connected to the Internet by way of an Internet Service Provider (ISP), wherein the computer system has a GUI-based web browser program and a programmed bar code symbol scanner interfaced therewith for automatically surfing to information resource (e.g., Web-sites) listed in a Web-site guide by simply scanning corresponding URL-encoded bar code symbols printed on the pages thereof.

A further object of the present invention is to provide an Internet Scanning System in the form of an interactive web-based television system, wherein the web-based television system comprises an Internet terminal unit connected to the Internet by way of an ISP, an audio-visual display monitor for displaying graphical and audio information content of Web-sites, a portable Internet surfing device having a wireless IR-based communication link to the Internet terminal unit and an integrated bar code symbol scanner for automatically surfing to (or among) Web-sites listed in a Web-site guide by simply scanning corresponding URL-encoded bar code symbols printed on the pages thereof.

A further object of the present invention is to provide such an Internet Scanning System in the form of a Scanner Integrated Terminal, wherein the Scanner Integrated Terminal is connectable to the Internet by way of a wireless (RF) link to an ISP, and has an integrated GUI-based web browser program, display panel, keypad, and programmed bar code symbol scanner for automatically surfing to Web-sites listed in a Web-site guide by simply scanning corresponding URL-encoded bar code symbols printed on the pages thereof.

Another object of the present invention is to provide a novel method of surfing to Web-sites on the Internet by scanning URL-encoded bar code symbols into GUI-based web browser programs, without the need of manual data entry operations or the like.

A further object of the present invention is to provide an Internet Scanning System, which includes an optical character reader programmed to read the character strings of URLs printed on various types of print media which, when read thereby, automatically connects the Internet Client System to the Internet Server that supports the Web-site specified by the read URL.

Another object of the present invention is to provide such an Internet Scanning System in the form of a desktop, laptop or palmtop computer system that is connected to the Internet by way of an Internet Service Provider (ISP), wherein the computer system has a GUI-based web browser program and a programmed optical character reader interfaced therewith for automatically surfing to Web-sites listed in a Web-site guide by simply reading corresponding URLs printed on the pages thereof.

A further object of the present invention is to provide an Internet Scanning System in the form of an interactive web-based television system, wherein the web-based television system comprises an Internet terminal unit connected to the Internet by way of an ISP, an audio-visual (AV) display monitor for displaying graphical and audio information content of Web-sites, a portable Internet surfing device having a wireless IR-based communication link to the Internet Terminal unit and an integrated optical character reader for automatically surfing to Web-sites listed in a Web-site guide by simply scanning corresponding URLs printed on the pages thereof.

A further object of the present invention is to provide such an Internet Scanning System in the form of a Scanner Integrated Terminal, wherein the Scanner Integrated Terminal is connectable to the Internet by way of a wireless (RF) link to an ISP, and has an integrated GUI-based web browser program, display panel, keypad, and programmed optical character reader for automatically surfing to Web-sites listed in a Web-site guide by simply scanning corresponding URLs printed on the pages thereof.

Another object of the present invention is to provide a novel method of surfing to Web-sites on the Internet by optically scanning the character strings of URLs into GUI-based web browser programs, without the need of manual data entry operations and the like.

Another object of the present invention is to provide a novel system and method for printing URL-encoded bar code symbols on various types of print media which, when read thereby, automatically connects the Internet Client System to the Internet Server that supports the Web-site specified by the scanned URL-encoded bar code symbol.

Another object of the present invention is to provide such a system in the form of a suitably programmed desktop Web-linked computer workstation or laptop computer system having a graphical user interface and an Internet browser program having a plug-in type URL-Menu Composition/Printing Module that supports the bar code menu composition, transmission and printing processes of the present invention.

A further object of the present invention is to provide such a system, in which the Internet browser program and plug-in URL-Menu Composition/Printing Module allows the user to easily compile the following information structure during operation of the Internet browser program: a list of human-readable URLs corresponding to a set or course of information serving Web-sites, a set of URL-encoded bar code symbol data structures corresponding thereto, a set of titles assigned to the URLs, a set of brief descriptions of content served at the Web-sites, and date or dates the set of Web-sites were last visited by the compiler, for subsequent printing in the form of a menu.

A further object of the present invention is to provide such a system, in which the compiled information structure can be electronically transmitted to a remote site, by e-mail, facsimile transmission, or other protocol available over the Internet, and thereafter printed out using appropriate print-driver software, so that the Web-sites listed in the compiled information structure can easily be visited by reading the corresponding URL-encoded bar code symbol into the Internet browser program using a bar code scanner.

Another object of the present invention is to provide a novel Web-site guide or directory comprising one or more sheets having a plurality of URL-encoded bar code symbols, corresponding human-readable URLs and Web-site content descriptions printed thereon.

These and other objects of the present invention will become apparent hereinafter.

BRIEF DESCRIPTION OF THE DRAWINGS

For a more complete understanding of how to practice the Objects of the Present Invention, the following Detailed Description of the Illustrative Embodiments should be read in conjunction with the accompanying Drawings, wherein:

FIG. 4 is a schematic representation of an exemplary window of an Internet browser program running on the system of FIG. 1, and also an exemplary window for the URL-menu CTP Module plug-in of the present invention allowing its user to compose, transmit and print URL-encoded menus according to the principles of the present invention;

FIG. 5 is a schematic representation of an exemplary sequence of Web-sites along a Web-site "surf course" that are to be digested within a URL-encoded menu composed and printed according to the present invention;

DETAILED DESCRIPTION OF THE ILLUSTRATIVE EMBODIMENTS OF THE PRESENT INVENTION

Figure 1:
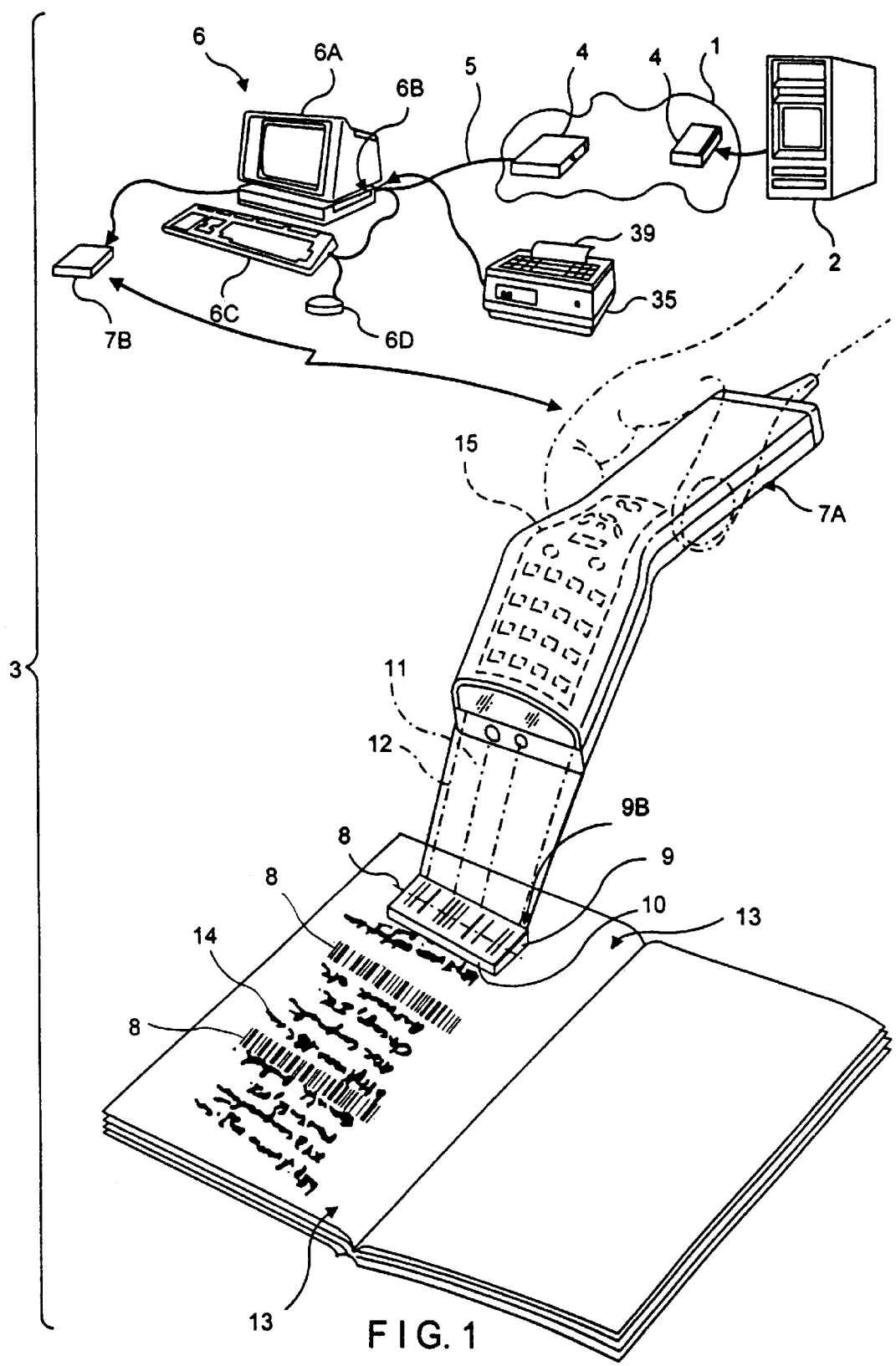
FIG. 1 is a schematic diagram of the first illustrative embodiment of the present invention, in which the Internet Scanning System hereof is realized in the form of a desktop computer system shown connected to the Internet by way of an ISP, and having a GUI-based web browser program and a bar code symbol scanner for automatically surfing to Web-sites listed in a Web-site guide by simply scanning corresponding URL-encoded bar code symbols printed on the pages thereof.

The illustrative embodiments of the present invention will be described with reference to the figure drawings wherein like elements and structures are indicated by like reference numbers.

In general, the system and method of the present invention is practiced in connection with a globally-based digital telecommunications network (known as the Internet). The function of the Internet is to provide an infrastructure that supports wired and wireless digital telecommunications throughout the world using the well known TCP/IP networking protocols. In general, the Internet infrastructure comprises Internet Service Providers (ISPs), Network Service Providers (NSPs), routers, telecommunication-lines and channels. etc., all well known in the art.

Connected to the Internet 1 by way of the Internet infrastructure (i.e., ISPs and NSPs) are many Internet Web-site Servers (i.e., computer systems) 2 that are physically located throughout the world and whose function is to serve information to Internet users when requested by client computer systems (i.e., client systems) 3. In general, each Internet Web-site Server 2 and client system 3 may be connected to the infrastructure by way of an ISP 4 (or NSP) using physical communication media or a wireless (RF-based) digital communication link 5 well known in the art. Notably, while each illustrative embodiment of the Internet Scanning System hereof is realized in the form of a Client System operably connected to the infrastructure of the Internet by way of an ISP, it is understood that the Internet connection may be achieved through an NSP or access point in the Internet infrastructure.

In the illustrative embodiments, each Internet Web-site Server 2 is realized as a computer system running conventional Web-site server software (e.g., WebStar® from StarNine, Inc.) and is interfaced with an ISP in a conventional manner. Each Internet Web-site Server is assigned a unique TCP/IP address (and Domain Name) on the Internet, and is provided with Internet networking software to support the TCP/IP protocol. In addition, each Internet Web-site server is provided with one or more application software programs for creating and maintaining hypermedia documents containing text, graphics and audio information within an information file structure expressed in HTML. Each HTML document on the WWW is physically stored in an Internet Server 2. The location of such information storage on the WWW is specified by a Uniform Resource Locator (URL), the syntax of which is well known in the art. The function of a URL is best illustrated by way of example. Metrologic Instruments, Inc., the assignee of the present invention, has launched a WWW site having a "home page" (i.e., first page) specified by the following URL: "http://www.metrologic.com". The type of information maintained at this Web-site, beginning with Metrologic's home page, can be of virtually any type (of a multi-media nature) and typically will be updated over time to reflect changes in either the company, its products, services and the like. The same is generally true for each and every other Web-site on the Internet, regardless of the type of information being served to client systems.

As illustrated in FIG. 1, the first illustrative embodiment of the Internet Scanning System hereof is realized in the form of a desktop computer system 6. As shown, the desktop computer system consisting of video monitor 6A, processor 6B, keyboard 6C, mouse 6D, and Postcript® laser printer 35, is connected to the Internet by way of an ISP 4. The computer system 6 has a GUI-based web browser program and a hand-held, wireless laser scanning bar code symbol reading system which is connected to the communication port of this host system in a conventional manner. In the preferred embodiment, the wireless bar code symbol reading system comprises a hand-supportable laser scanning bar code symbol reading device 7A and a base unit 7B which receives RF signals transmitted from device 7A upon the successful reading of each bar code symbol whereby the base unit 7B then produces an acoustical acknowledgement signal in response to each such successful read. The bar code symbol reading system can be realized by any one of the (i) wireless bar code symbol reading systems disclosed in copending application Ser. No. 08/292,237 filed Aug. 17, 1994, or (ii) tethered bar code symbol reading systems disclosed in copending application Ser. Nos. 08/476,069 and 08/660,643, each said application being incorporated herein by reference.

The function of the programmed bar code symbol reader is to read a bar code symbol 8 that is encoded with the URL of a Web-site to be accessed by the Internet Scanning System, and produce symbol character data representative of the URL. As used hereinafter, this special type of bar code symbol shall be referred to as a "URL-Encoded Bar Code Symbol". The information structure of this symbol character string should be formatted so that it corresponds to the syntactical structure of the URL and is thus readily utilizable by any conventional GUI-based Internet browser program, such as the Navigator® from Netscape or the Internet Explorer® from Microsoft. In order to provide such conventional browser programs with scanned-data input capabilities, a Plug-in Module (e.g., browser subprogram) can be readily written and installed within the browser program. The function of the plug-in module is to (i) automatically read scanned URL information stored within an addressed data buffer at the I/O port of the client computer platform (supporting the Internet Scanning Terminal) 6, and (ii) write the URL information (in an appropriate format) to the data buffer assigned to the URL entry window 40A of the Internet browser display Screen 40 shown in FIG. 4, and then (iii) initiate the HyperText Transmission Protocol (HTTP) over the Internet in order to access the information resource located at the URL. While it is preferred that each Internet Scanning System of the present invention has a preloaded Internet browser program provided with the above-described plug-in module, or the functionalities provided thereby, it may be desirable in some instances to distribute or down-load the browser program to client computer systems from an Internet-based Information Server on the WWW using the well known file transfer protocol (FTP). In this way, conventional client computer systems can be converted into Internet Scanning Terminals according to the present invention.

Once the Internet Scanning Terminal is provided with an Internet browser program with the above-described plug-in module of functionalities, bar code symbol reader (e.g., a Metrologic Scanner MS951-48 with keyboard wedge) is connected to the data-input port of the client computer platform 6 so that URLs encoded in printed bar code symbols can be automatically entered as input into the Internet browser program by simply reading the printed URL-encoded bar code symbols. Whenever new URL information is provided to the Internet browser program by bar code symbol scanning, the particular information resource corresponding to the URL is automatically accessed by the Internet Scanning System of the present invention. Such Internet access operations are achieved by the Internet browser program cooperating with the addressed Internet Server and carrying out HTTP in a manner well known in the art.

In general, each URL-encoded bar code symbol of the present invention can be either a linear (1-D) or 2-D bar code symbol structure of virtually any symbology that allows for the encoding of the (ASCII-type) information contained within a 5 URL-type information structure, the syntax of which is well known in the art. In the preferred embodiment, the URL-Encoded Bar Code Symbol 8 is realized as a truncated-type bar code symbol constructed using any one of the following bar code symbologies: Code 128; full ASCII character set of Code 39; and Code 93. Preferably, each such bar code symbol is printed above, below or alongside each Web-site URL 14 or its listing in a Web-site guide or directory 13. Method and apparatus for composing and printing such bar code symbol lists and menus will be described in greater detail hereinafter. In general, the URL-encoded bar code symbol can be of any length. Notably, the advantage of using the truncated bar code symbol structure is that the height of the bars and spaces is relatively short in relation to the length of the bar code, thus allowing the URL-encoded truncated Symbol 8 to be easily printed adjacent each Web-site listing appearing on crowded pages of Web-site guides and catalogues, as illustrated in FIG. 1A.

In accordance with the present invention, Web-site listings and menus, in which URL-encoded bar code symbols may be printed, include various types of printed guides, directories or publications which digest, catalogue, organize or otherwise list WWW sites or information resources that exist on Web-site Servers throughout the Internet. Examples of such printed Web-site publications include, for example: the "WWW Yellow Pages" (1996) published by the New Riders Publishers, Inc.; "PC NOVICE GUIDE TO THE WEB: How to find anything on the Web" (1996) published by Peed Corporation; "Cybersurfer", published by Starlog Group, Inc.; "Internet Underground", published by Ziff-Davis; "Internet User", published by Ziff-Davis; "Internet World", published by Mecklermedia; "The Net", published by Imagine Publishing; "Net Guide", published by CMP Media; "Online Access", published by Red Flash Internet; "The Web", published by International Data Group; "Websight", published by New Media, Inc.; "Yahoo Internet Life", published by Ziff-Davis and Yahoo; WebTV Guides; or any other printed publication that one may use to find Web-sites (of interest) that one would like to visit (surf to) and explore.

Figure 1A:
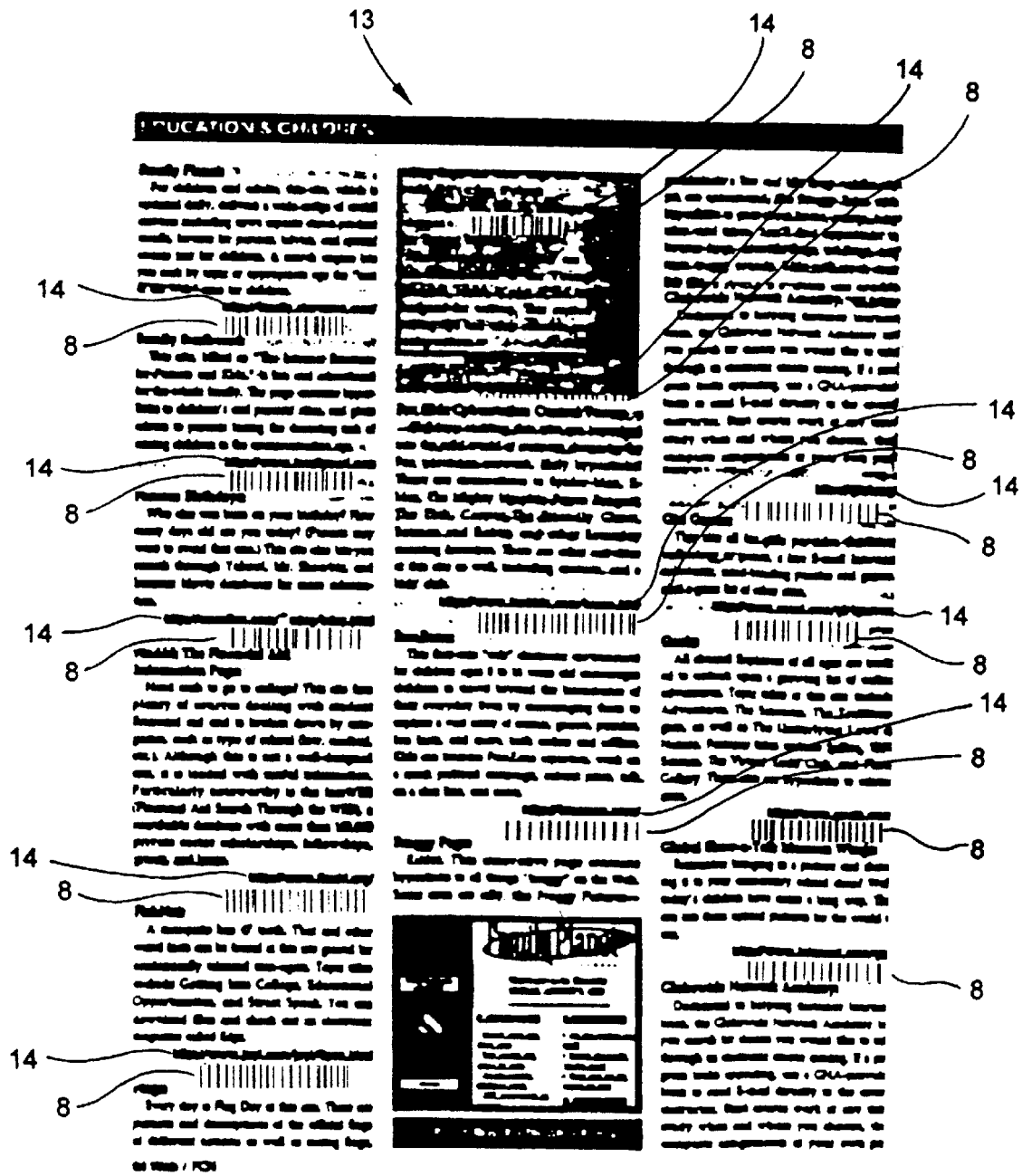
FIG. 1A a is schematic representation of a single sheet or page of the Web-site Directory of the present invention, showing several URL-encoded (truncated) bar code symbols printed thereon along with their corresponding human-readable URLs and content descriptions.

As shown in FIGS. 1 and 1A, the programmed bar code symbol scanner 7 of the Internet Scanning System of the first illustrative embodiment is particularly designed so that closely nested Web-site listings on a single page can be read without inadvertently reading undesired URL-encoded bar code symbols. This added scanning control feature is achieved in the bar code symbol reader 7A of FIG. 1 by providing the automatic laser scanning bar code symbol reader 7A with an optically-transparent scanning plate 9A supported from reader 7A by an optically transparent extension 9B. The scanning plate 9A has formed therein a sighting window (i.e., aperture) 10, through which a URL-encoded bar code symbol 8 is automatically scanned and read when such a printed symbol (on a substrate) is aligned with the sighting aperture. In this particular embodiment of the bar code symbol reader 7A, the IR-based object detection field 11 extends just slightly beyond the sighting window 10 so that the laser scanning by laser beam 12 is automatically initiated only when an object (e.g., Web-site Guide) 13 is placed up against the sighting window 10, as when the scanning plate is brought in contact with URL-Encoded Bar Code Symbol 8 associated with a particular Web-site listing, shown in FIG. 1A. The design and construction details associated with automatic bar code symbol reader 7A can be found in Applicant's prior U.S. application Ser. No. 08/292,237 filed Aug. 17, 1994, incorporated herein by reference. As shown in FIG. 1, this scanning device can be provided with a keypad 15 in a manner known in the art, for manually entering the characters of URLs, as needed or required.

Figure 2:
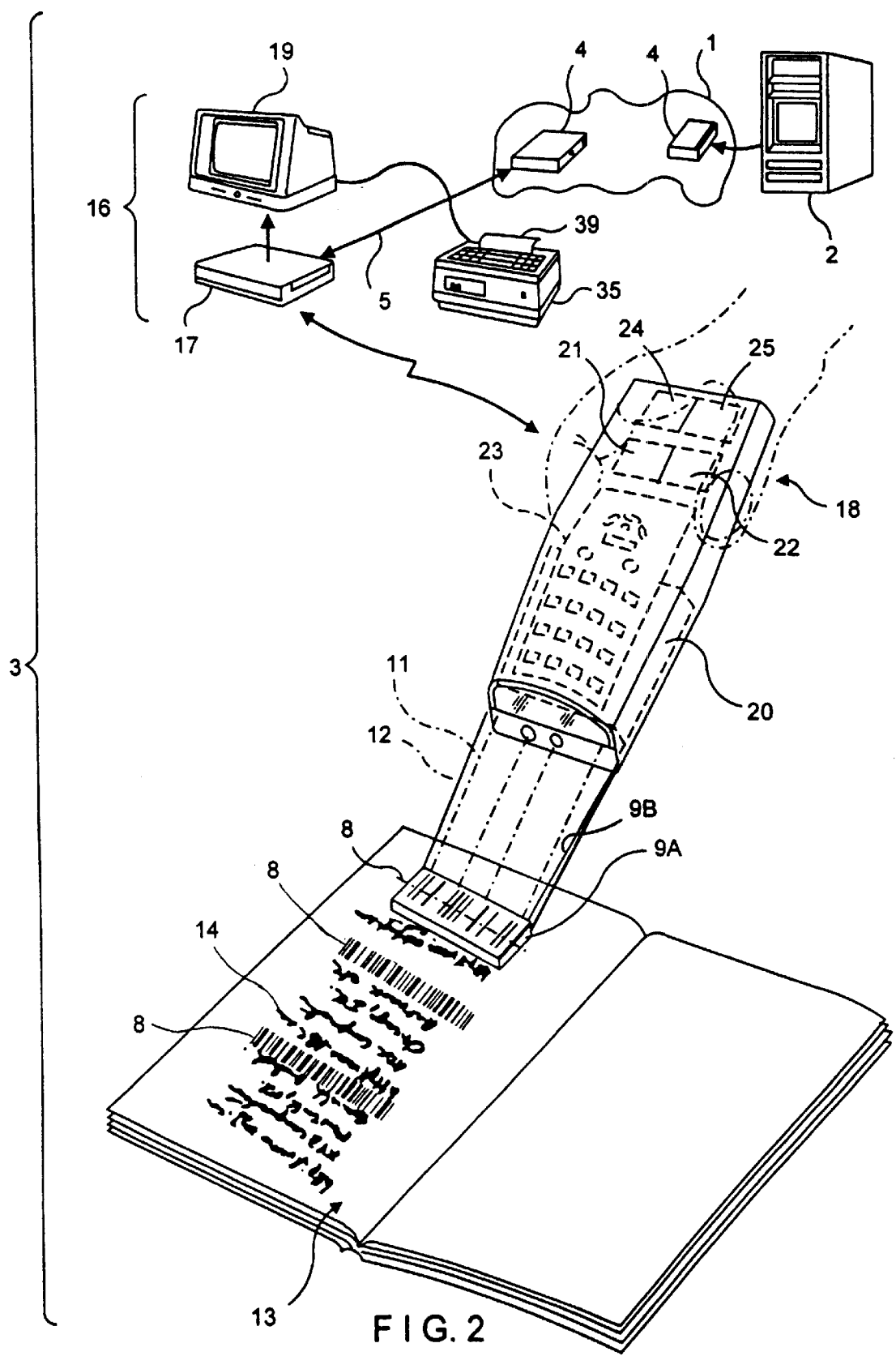
FIG. 2 is a schematic diagram of the second illustrative embodiment of the present invention, in which the Internet Scanning System hereof is realized in the form of an interactive web-based television system which comprises a Terminal Unit shown connected to the Internet by way of an ISP and has a portable Internet Navigation (i.e., Surfing) Device having an IR-link to the Terminal Unit, and a bar code symbol scanner integrated therewith for automatically surfing to Web-sites listed in a Web-site guide by simply scanning corresponding URL-encoded bar code symbols printed on the pages thereof.

As shown in FIG. 2, the second illustrative embodiment of the Internet Scanning System hereof is realized in the form of an interactive web-based television system 16 which comprises an Internet Terminal Unit 17, a Remote Control Scanning Device 18 and a standard (NTSC or PAL) color television set 19. As shown, the Internet Terminal Unit 17 is connected to the Internet by way of an ISP 4 and includes means for supporting: (i) a GUI-based Internet browser program such as the Internet Navigator® from Netscape Communications or the Internet Explorer® from Microsoft, Inc.; and (ii) the TCP/IP networking protocol on the Internet. In the preferred embodiment, the Internet Terminal Unit 17 can be realized using any one of a number of commercially available Internet Terminal devices, such as, for example: the Mediamaster 9500™ Internet Terminal from Nokia, Inc.; the NetStation™ Internet Terminal from Acorn Computer; or the "Internet Digital Appliance" from Diba.

As shown in FIG. 2, the Remote Control Scanning Device 18 of the second illustrative embodiment can be realized by integrating a miniature automatic bar code symbol reading module 20 into the wireless remote control device that is provided with the commercially available terminal unit that is used to practice this embodiment of the present invention. Preferably, automatic bar code symbol reading module 20 is similar to the device described in great detail in Applicant's copending application Ser. No. 08/292,237 supra. Such laser scanning engines, as they are called, are commercially available from Metrologic Instruments, Inc., of Blackwood, N.J., under the tradename ScanQuest®. The manner in which such a laser scanning engine can be integrated into any one of the remote control devices of the above-identified Internet Terminals, and thus provide the Remote Control Scanning Device 18, will be described below.

The Mediamaster 9500™ Internet Terminal from Nokia, Inc., the NetStation™ Internet Terminal from Acorn Computer, or the Internet Digital Appliance from Diba, are each provided with a wireless remote control device which includes a programmable microcontroller (i.e., microprocessor) operably connected to a system bus. The system subcomponents that are connected to this system bus structure include, for example: program memory realized in the form of EPROM 21; data storage memory realized in the form of RAM 22; keypad 23, data storage registers and interface circuitry; an IR-based communication circuit and interface circuitry 24; and power supply and power distribution circuitry 25. In such commercial products, no visual display device (e.g., LCD panel) is provided, as all display functions are provided on the television screen using an on-screen display format well known in the art. Integration of an automatic ScanQuest® Laser Scanning Module (Model No. IS4120) into the system architecture of such wireless remote control devices can be achieved by adding additional data registers to the system bus, and connecting the data output port of the scanner to such registers in a conventional manner. Additional control logic will have to be provided by the microcontroller in order to ensure priority of the scan data from the scanner over the data entered manually into the system. All such modifications are within the ordinary skill in the art.

As shown in FIG. 2, Remote Control Scanning Device 18 has an optically-transparent scanning plate 9A supported by an optically transparent extension 9B. The scanning plate 9A has formed therein a sighting window (i.e., aperture) 10, through which a URL-encoded bar code symbol 8 is automatically scanned and read when such a printed symbol (on a substrate) is aligned with the sighting aperture. The IR-based object detection field 11 extends just slightly beyond the sighting window 10 so that the laser scanning beam 12 is automatically initiated only when an object (e.g., Web Guide) 13 is placed up against the sighting window 10, as when the scanning plate 9A is brought in contact with URL-Encoded Bar Code Symbol 8 associated with a particular Web-site listing. During operation, the Remote Control Scanning Device 18 is used to read URL-encoded bar code symbols 8 printed in Web-site GuideBook 13 in order to connect to the corresponding Web-sites thereof.

While any standard (NTSC or PAL) color television set can be used in connection with the Internet Terminal 17 to display graphical and audio information content associated with any particular Web-site accessed by the system, it is preferred that a higher-resolution (VGA or SVGA) computer monitor is used in connection therewith to display high resolution graphics.

Figure 3:
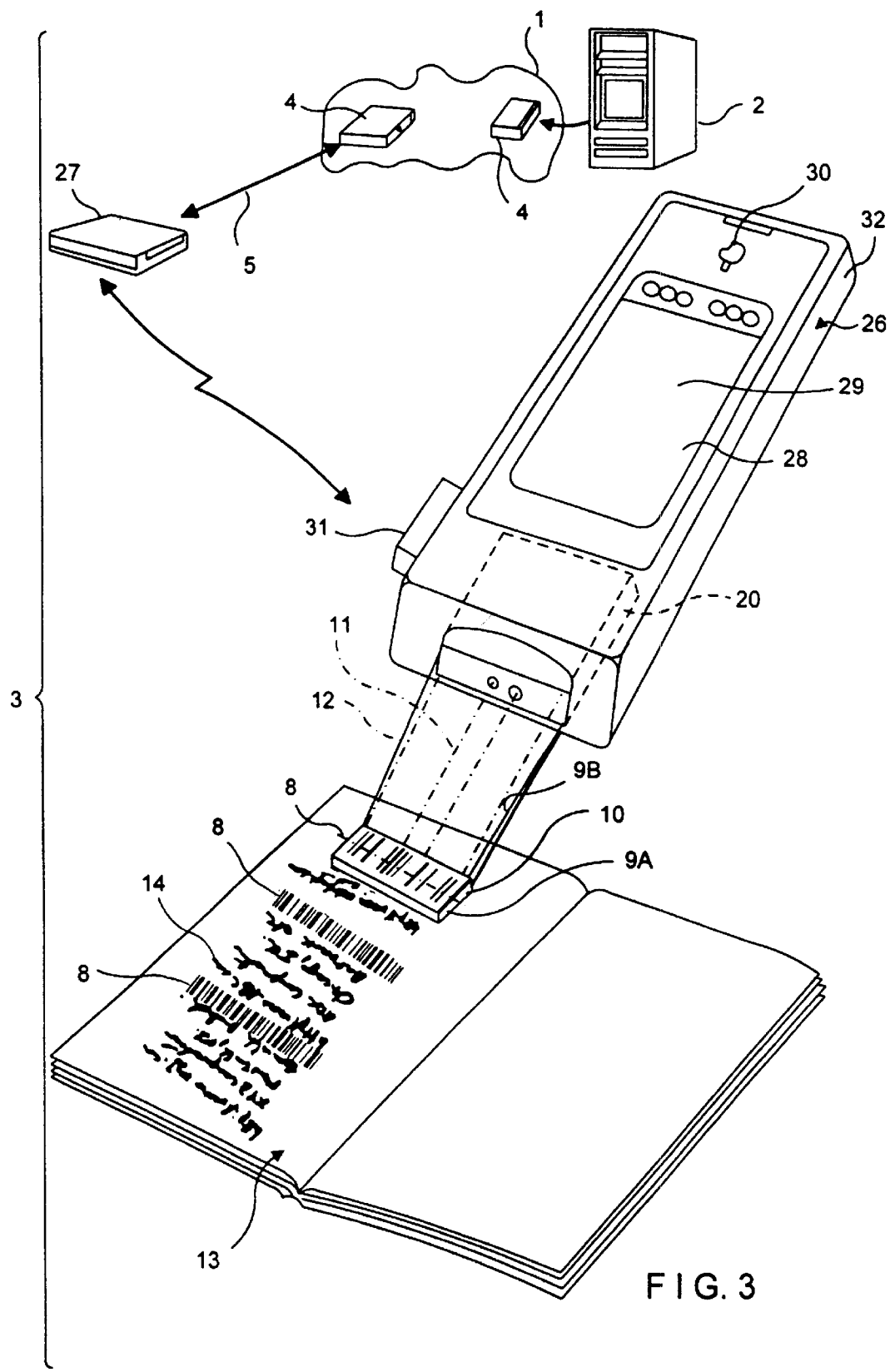
FIG. 3 is a schematic diagram of the third illustrative embodiment of the present invention, in which the Internet Scanning System hereof is realized in the form of a hand-held Scanner Integrated Terminal shown connected to the Internet by way of a wireless link to an ISP, and having an integrated GUI-based web browser program, display panel, keypad, and programmed bar code symbol scanner for automatically surfing to Web-sites listed in a Web-site guide by simply scanning corresponding URL-encoded bar code symbols printed on the pages thereof.

As shown in FIG. 3, the third illustrative embodiment: of the Internet Scanning System hereof is realized in the form of a hand-held Scanning Integrated Terminal. The Scanner Integrated Terminal 26 is shown connected to an ISP 4 by way of a radio-base station 27 and wireless link 5. The hand-held Scanning Integrated Terminal 26 has an integrated GUI-based web browser program, display panel 28, touch-screen type keypad 29, and programmed bar code symbol scanner 20. The function of the bar code symbol scanner 20 is to read a bar code symbol 8 that is encoded with the URL of a Web-site to be accessed by the Internet Scanning System, and produce symbol character data representative thereof.

In the illustrative embodiment, the Scanner Integrated Terminal 26 is realized as a transportable computer, such as the Newton® Model 130 Messagepad 30 from Apple Computer, Inc. of Cupertino, Calif. This device is provided with NetHopper™ brand Internet Access Software from which supports the TCP/IP networking protocol within the Newton MessagePad. The Newton Messagepad is also equipped with a Motorola PCMCIA-based modem card 31 having a RF transceiver for establishing a wireless digital communication link with either (i) a cellular base station, or (ii) one or more satellite-base stations 27 connected to the Internet by way of an ISP 4 in a manner well known in the global information networking art. While it is understood that, in some instances, it may be desired to connect a pen or wand device to the serial port of the Newton MessagePad to provide bar code symbol reading capabilities thereto, it is generally preferred that automatic laser scanning engine 20 (e.g., Metrologic ScanQuest® Laser Scanning Module Model No. IS4120), be interfaced with the serial communications port of the Newton MessagePad so as to realize the Internet Scanning System of the third illustrative embodiment hereof.

As shown in FIG. 3, the combined Newton MessagePad, ScanQuest® Laser Scanning Module 20 and auxiliary battery supply (not shown) are completely housed within a rubberized shock-proof housing 32, in order to provide a hand-supportable unitary device. The rubberized housing is provided with a scanning aperture 10 realized within an optically transparent scanning plate 9A supported by extension 9B. The function of the scanning aperture 10 is to allow the projected laser beam 12 to sweep across a URL-encoded bar code symbol 8 located within the sighting window 10 of optically-transparent scanning plate 9A, once the object (e.g., Web-site guide) 13 is detected by the object detection field 11.

In each of the three illustrative embodiments described above, the bar code symbol scanner can be replaced by a programmed optical character reader realized using the automatic holographic laser scanning technology disclosed in great detail in Applicant's copending application Ser. No. 08/573,949 filed Dec. 18, 1995, incorporated herein by reference. The function of the programmed optical character reader is to allow the Internet Scanning Terminal to access any desired Web-site by reading the alphanumeric character string comprising the URL thereof, and provide the same as output to the GUI-based Internet browser program thereof. In such alternative embodiments, the function of the optical character reader (i.e., character reading module) is to read the ASCII characters comprising the URL 14 printed on a Web-site guide or like publication, avoiding the need for manual key entry operations.

Having described various illustrative embodiments of the Internet Scanning Terminal of the present invention, it is appropriate at this juncture to describe a system and method for composing, transmitting and printing lists (e.g., menus) of URL-encoded bar code symbols in various ways according to the principles of the present invention.

As shown in FIG. 4, the Web-linked client computer workstation 6 of FIG. 1 has a graphical user interface (GUI) and an Internet browser (or communicator) program that has a plug-in type module (i.e., subprogram) for composing, transmitting and printing lists and menus of URL-encoded bar code symbols and information elements associated therewith (hereinafter the "Composition/Printing Module"). The Composition/Printing Module can be realized as a plug-in module to the Netscape Navigator browser program, the Microsoft Explorer browser program, or other Internet browser program presently available or developed in the years ahead, using programming techniques and languages (e.g., Java) known in the art. The purpose of this Module is to cooperate with the Internet browser program and support the user during the composition and editing of lists (i.e., menus) of URL-encoded bar code symbols and information fields related thereto in accordance with the principles of the present invention, and then enable such lists and menus to be printed locally using printer 35 shown in FIG. 1, or transmitted to a remotely located system for printing. As such, the Module is provided with an editing mode to edit information entered into information fields associated with any, particular bar code list or menu of the present invention. Composition and printing functionalities and enabling programming code embodied within the Module or browser program of the present invention can be found in Bar Code Pro® brand Bar Code Symbol Composing and Printing software sold by SYNEX, of Brooklyn, N.Y. Optionally, the Module and/or browser program can also embody the functionalities provided by FilePro® bar code database software, also available from SYNEX.

As shown in FIG. 4, the Composition/Printing Module has an associated "display window" which can be opened in a conventional manner to allow the user to easily compile bar code symbol menus during operation of an Internet browser program. In the illustrative embodiment shown in FIG. 4, the bar code menu display window is shown to comprise information display fields 36A, 36b 36N associated with three exemplary information resources on the WWW that have been listed within a bar code menu in composition. As shown, this listing of information display fields graphically present on display monitor 6A: a set of human-readable URLS corresponding to a set or course of information serving Web-sites schematically represented in FIG. 5, and in callout 36A1, 36B1, 36N1; a set of titles assigned to the URLs (which may be directed to the owner of the site, the information content contained therein, etc.) 36A2, 36B2, 36N2; a set of brief descriptions of content (DOC) served at the Web-sites indicated by reference numerals 36A3, 36B3, 36N3; and the date or dates the set of Web-sites were last visited by the lists composer, indicated by reference numerals 36A4, 36B4, 36N4.

Figure 6A:
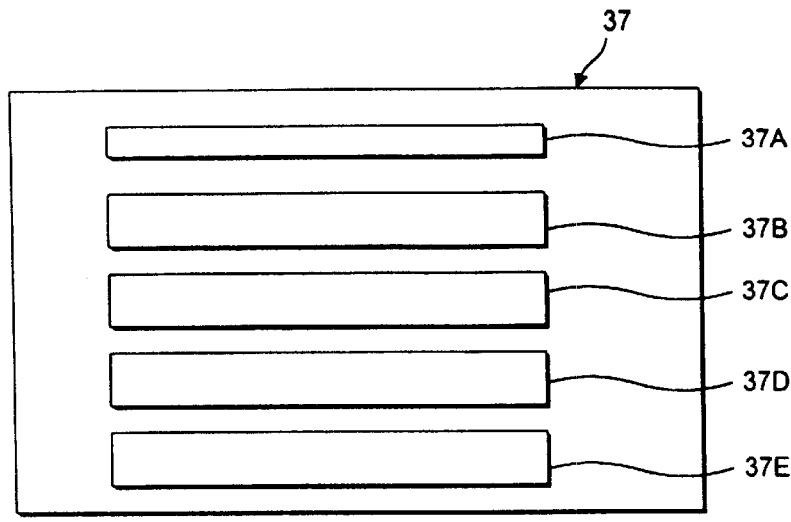
FIG. 6A is a schematic representation of an exemplary portion of an information storage structure for a URL-encoded Menu, showing the various information storage fields contained therein.

In FIG. 6A, an information storage structure 37 is shown for storing the information elements associated with a given URL information block in a bar code menu composed using the Composing/Printing Module during on-line Internet surfing sessions or while off-line. As shown, each information storage structure 37 comprises the following information fields for a given information resource: URL Field 37A for storing the URL of Web-site location (e.g., information resource) associated therewith; URL-Encoded Bar Code field 37B for storing information descriptive of the URL-Encoded bar code associated with the URL of the information resource; Title Field 37C for storing information descriptive of the title assigned to the corresponding information resource; Content Description Field 37D for storing information descriptive of the content of the information resource; and Data Field 37E for storing information descriptive of the date the composer or his agent last visited the information resource prior to composition of the bar code symbol menu.

Figure 6B:
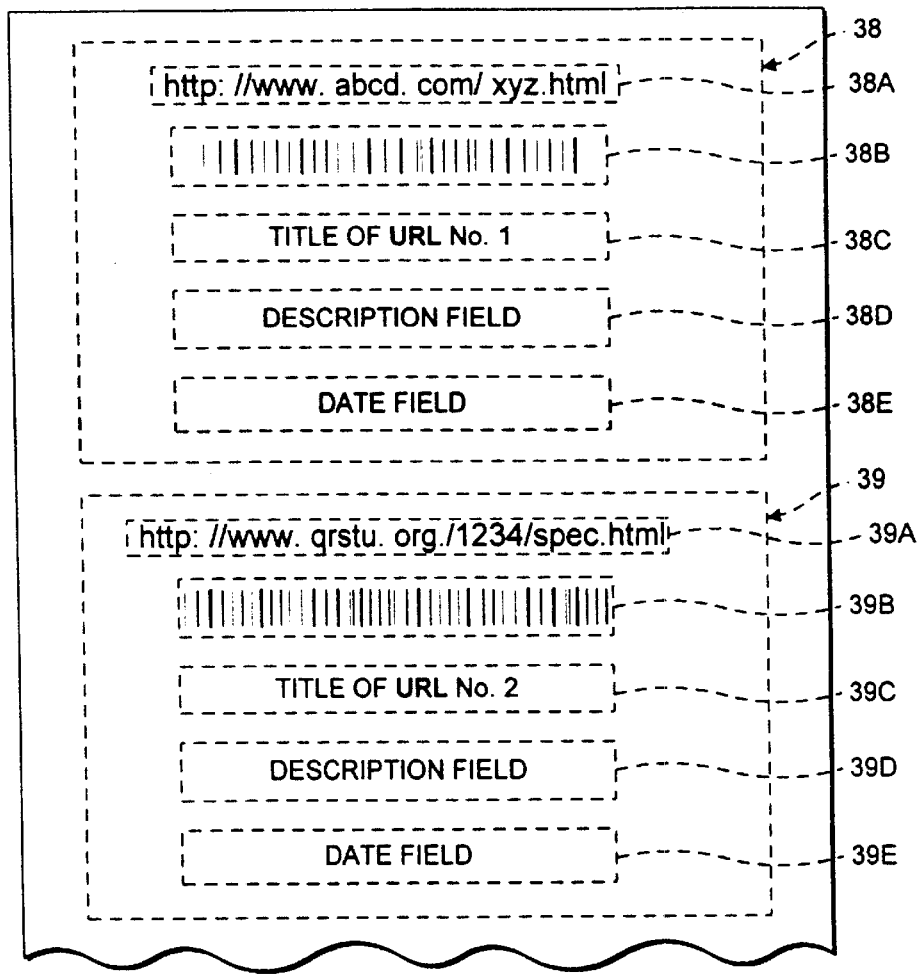
FIG. 6B is a schematic representation of an exemplary section of the URL-encoded Menu of FIG. 6A, showing the various information display fields contained therein.

In FIG. 6B, an exemplary section of a printed URL-encoded menu is shown. As shown, each printed block of information 38 associated with a particular Web-site (or Internet information resource) has the following information display fields: an information display field for graphically displaying the corresponding URL, indicated by reference numeral 38A; an information display field for the URL-encoded bar code symbol, indicated by reference numeral 38B; an information display field for graphically displaying the Title assigned to Web-site location referenced by the corresponding URL, indicated by reference numeral 38C; an information display field for graphically displaying the description of the information content served at the Web-site location referenced by the corresponding URL, indicated by reference numeral 38D; and an information display field for graphically displaying the date on which the composer or his agent last visited the information resource, indicated by reference numeral 38E. In general, a number of such information display blocks can be printed on a single sheet of print media (e.g., paper, plastic, etc.) 39. The particular display layout for the information display block will depend on the application at hand and typically will vary from embodiment to embodiment of the present invention. For example, in some embodiments, the printed information display blocks will be arranged in a single column down each printed sheet. In other embodiments, the printed information display blocks will be arranged in two or more rows or columns. In yet other embodiments, the layout of such information display blocks may be of random or quasi-random structure.

Figure 7A:
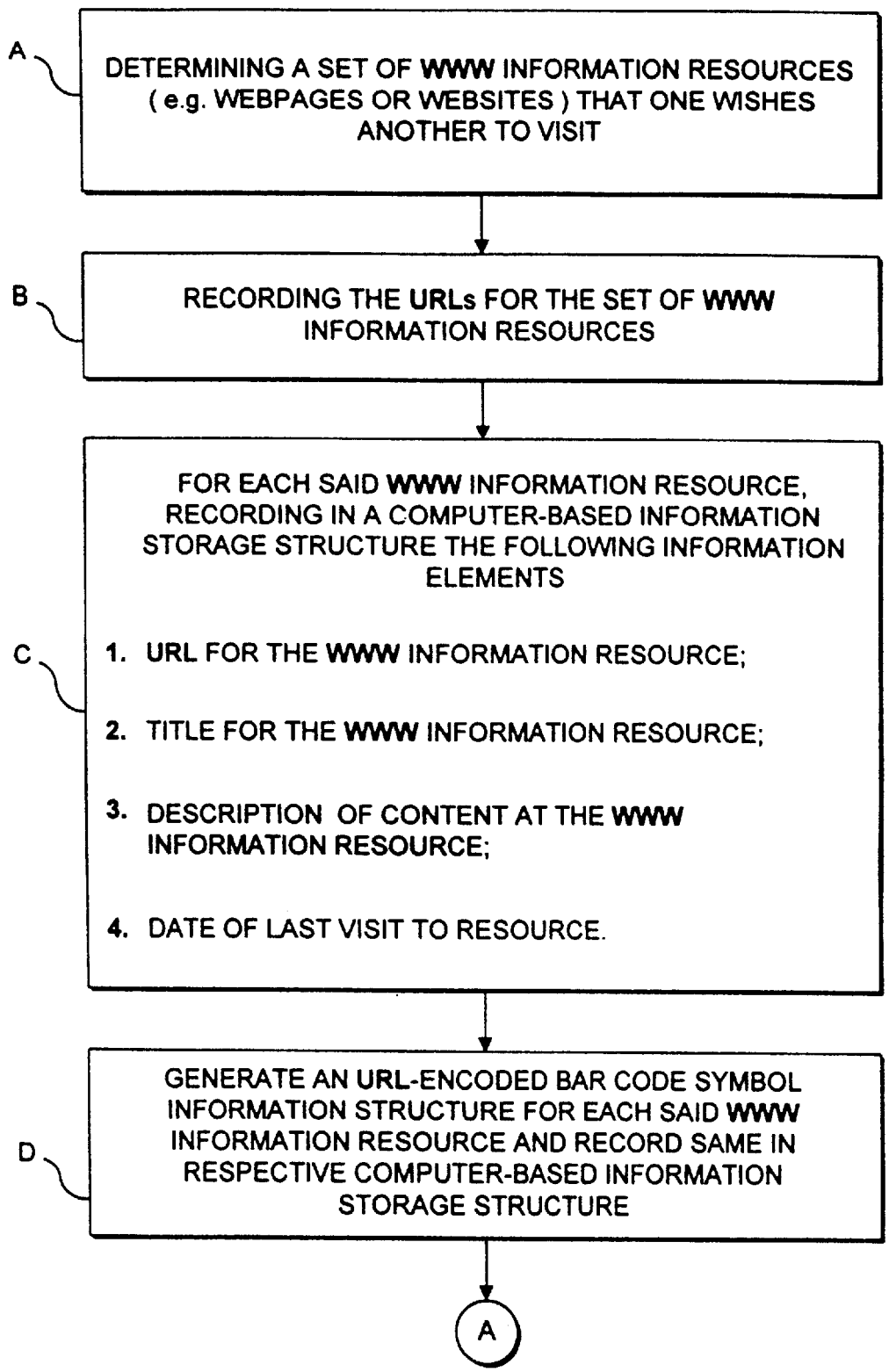
FIGS. 7A and 7B provide a flow chart setting forth the steps carried out during the execution of the illustrative embodiment of the Bar Code Menu Composition, Transmission and Printing Module of the present invention.
Figure 7B:
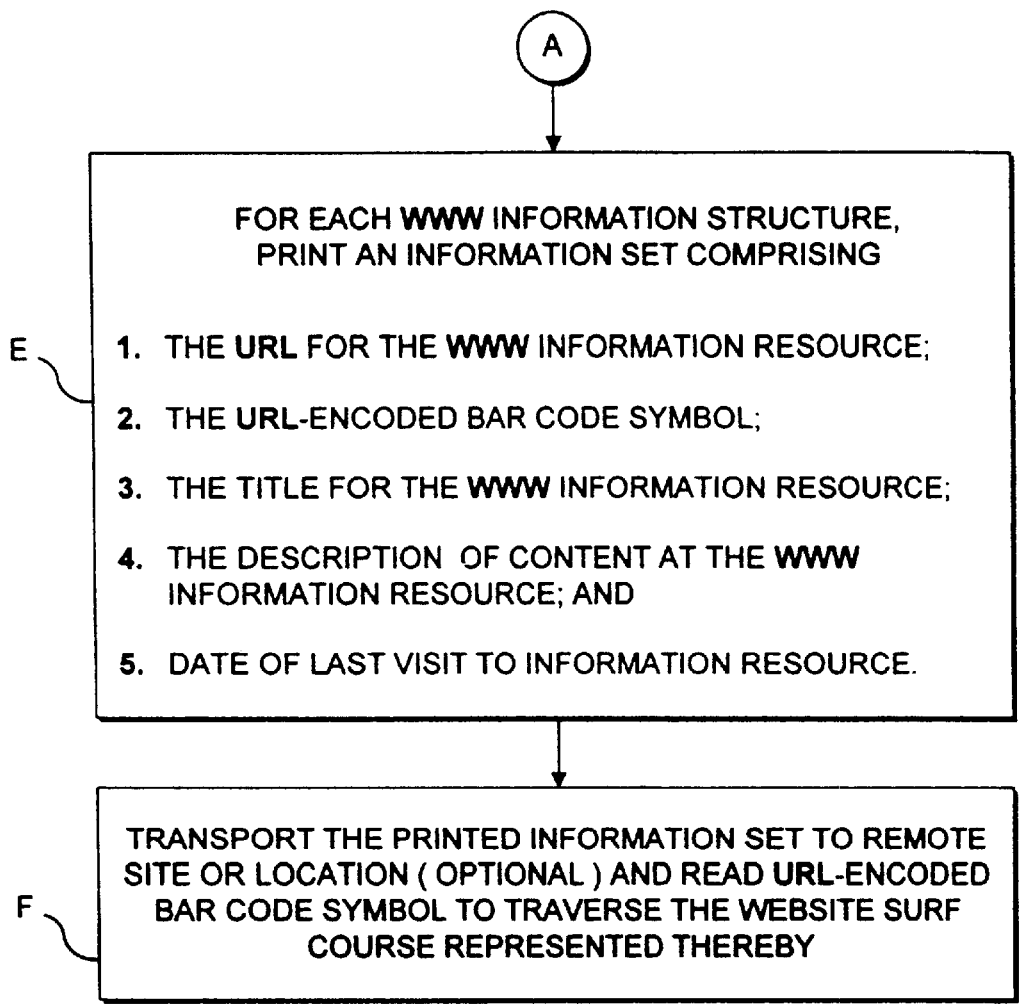

FIGS. 7A and 7B set forth a high-level flow chart describing the steps carried out during composition, transmission and printing of URL-encoded bar codes according to the method of the present invention. In the illustrative embodiment, this method is carried out while using a GUI-based Internet browser program (on-line), with the above-described plug-in Module installed therein enabling the user to compose, transmit and print bar code menus of the type schematically illustrated in FIGS. 6A and 6B. It is understood, however that the method can also be carried out while the Internet browser program is "off-line". Alternatively, the functionalities of the module to be described in greater detail below can be realized in a separate program designed to run "in the background" of the operating system while the browser is running, or run by itself when the Internet browser program is not running.

As indicated in Block A of FIG. 7A, the method involves first determining completely or partially, a set of information resources on the Internet (e.g., WWW or FTP Servers) that the composer wishes to visit presently or in the or future. Typically, the Internet browser program with the installed Composition/Printing Module browser hereof will be enabled during the composition process, generally represented at Blocks A through D in FIG. 7A. This list or ordered set of information sources identified by the composer may be thematically related by a particular subject or topic which the composer may have in mind before, during or after the composition process. The list may be, however, simply a collection of information resources on the WWW, for example, which the composer would like to catalog in the form of a bar code menu so that others may easily visit the catalogued collection of Web-sites by simply reading URL-encoded bar code symbols from a printed menu, as described hereinabove. In the field of education, for example, such bar code menus could be composed by teachers or professors and distributed to their students so that they can visit the catalogued Web-sites either inside or outside the classroom or lecture hall. Writers and/or editors of books, journals and magazines could print URL-encoded bar code symbols in the back of their publications (corresponding to references cited in their published works). Brochures and manuals for products and/or services could contain lists of URL-encoded bar code symbols that point to information resources on the Internet, which contain information relating to such products and/or services. Printed (i.e. hard-copy) Web-site magazines, catalogues, directories and the like can be formatted with URL-encoded bar code symbols of the present invention, as illustrated in FIG. 1A and described above, to enable Internet access thereto by scanning such encoded bar code symbols.

As indicated at Block B in FIG. 7A, the composer employs the Internet browser program of the present invention to record the URLs for the set of information resources on the WWW. The URLs can be entered into their appropriate information recording fields, consecutively at a particular point in time, or over a period of time when the composer is surfing the WWW and determining which WWW information resources should be catalogued within the menu under composition.

As indicated at Block C in FIG. 7A, the composer records a number of information items in an information storage file (as shown in FIG. 6A) displayed on the Internet browser screen 40 of the computer terminal shown in FIG. 4. For each WWW information resource, the composer is encouraged to enter the following information items: the URL for the WWW information resource; the Title assigned to the WWW information resource by the composer; and the description of the information content at the WWW information resource. Collectively, these related items of information are stored and form an information block within the information storage structure of the file maintained by the CTP Module and As indicated at Block D in FIG. 7A, after each information block is recorded for a particular WWW information resource, the plug-in Composition/Printing Module is used to automatically generate a URL-encoded bar code symbol information structure therefor and record this information in its respective information field within the information storage structure represented in FIG. 6. Once a list of URLs has been captured and recorded within the information storage structure underlying any particular bar code menu, the composer may then decide during the editing mode of the plug-in Module, exactly how the Web-site information blocks, shown in FIGS. 6B, should be ordered for presentation to his or her audience upon printing.

As indicated in Fig. E of FIG. 7B, a composed bar code symbol menu as shown in FIG. 6B is printed out on a sheet of paper using conventional Postscript® printing equipment 35, illustrated in FIG. 1, for example. At this stage of the process, the following information items are printed out for each WWW information resource: the URL for the WWW information resource; the URL-encoded bar code symbol; the title assigned to the WWW information resource by the composer; the description of the WWW information resource; and the date on which the composer or his agent last visited the information resource. Expectedly, the display format for any printed information file according to the present invention will vary from embodiment to embodiment. Preferably, the Composition/Printing module installed within the Internet browser program hereof will be provided with a number of different display formats, from which the composer can easily choose to satisfy the requirements of the project and application at hand.

As indicated at Block F, the composer may optionally choose to transport by electronic data transmission or, facsimile transmission, any composed bar code symbol menu according to the present invention. In such instances, the compiled information storage file (as shown in FIG. 6A) representing the composed menu can be electronically transmitted to a remote site, by e-mail, facsimile transmission, or other protocol available over the Internet, and thereafter printed out using appropriate print-driver software. This way, the WWW information resources listed in the compiled information structure can be easily visited by reading the corresponding URL-encoded bar code symbols into the Internet browser program using a bar code scanner. Alternatively, the bar code menu can be printed out locally and then transmitted to a remote location by way of facsimile transmission for print out and subsequent use. When using this latter technique, however, careful consideration must be accorded to the resolution of the printed bar codes, as their resolution may be significantly reduced due to the scan quality of the facsimile transmission, and printing required by this latter technique. In such instances, it may be desirable to scale-up the bar codes during menu composition to compensate for expected resolution losses downstream.

The bar code menu composition/printing process of the present invention has been described above in connection with a commercially available GUI-based Internet Browser program that has been provided with a plug-in module that enables the menu composition, transmission and printing processes of the present invention. It is understood, however, that in alternative embodiments of the present invention, an independent program may be written to carry out the interactive menu composition/transmission/printing process illustrated in FIGS. 7A and 7B. In such instances, the composition program could be designed to run in the background of the operating system while the composer is using the Internet browser program to explore Cyberspace and determine which Web-sites should be listed in the bar code menu in composition. Once a list of URLs has been captured and recorded within the information storage structure underlying any particular bar code menu, the composer may later, during the editing mode of the program, decide exactly how the Web-site information blocks, shown in FIG. 6A, should be ordered for presentation to his or her audience upon printing.

Having described the illustrative embodiments of the present invention, several modifications readily come to mind.

Instead of using a laser scanning module to construct the Internet Scanning Terminals of the present invention illustrated in FIGS. 1, 2 and 3, one may use CCD-type bar code scanning engines (or modules) employing LEDs to illuminate bar code symbols in the scan field, and CCD-type linear or array devices for capturing images thereof for subsequent decode processing. Examples of CCD scanning modules that can be used to construct CCD-based Internet Scanning Terminals according to the present invention can be found in the following U.S. Pat. Nos.: 5,550,366; 5,354,977; 5,291,009; 5,484,994; 5,349,172; 5,532,467; each being incorporated herein by reference in its entirety.

Figure 8:
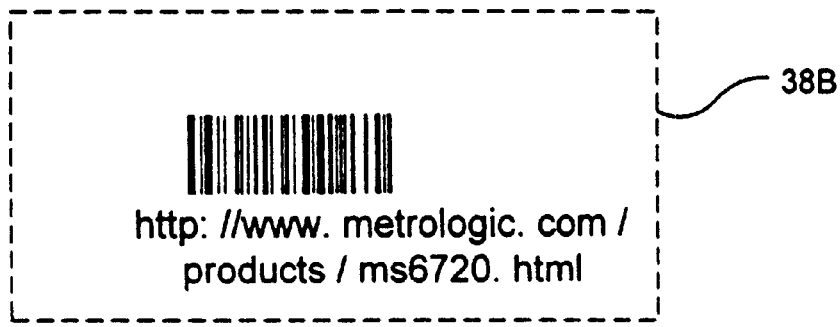
FIG. 8 is a graphical representation of an exemplary 2-D URL-encoded bar code symbol of the PDF417 Symbology, encoded according to the principles of the present invention.

Also, instead of using encoding 1-D (linear-type) bar code symbols with URL information, as taught herein, one may encode URL information in 2-D bar code symbols as schematically illustrated in FIG. 8. In such instances, one would provide a 2-D bar code symbol reading engine (or device) within each Internet Scanning Terminal of the present invention to read the URL information encoded within 2-D bar code symbols. Examples of 2-D laser scanning bar code symbol reading devices that can be used to construct "2-D type" Internet Scanning Terminals according to the principles of the present invention are disclosed in the following U.S. Pat. Nos.: 5,594,232; 5,523,552; 5,504,316; 5,414,250; 5,373,148; 5,319,181; each being incorporated herein by reference in its entirety. In other embodiments of the present invention, one may employ scanning modules capable of reading both 1-D and 2-D type bar code symbols.

In order to indicate that a particular printed publication or object bears a URL-encoded bar code symbol according to the present invention, and not a conventional bar code symbol (e.g., UPC Symbol), it may be advantageous to print the entire or primary portion of the encoded URL (e.g., http://www.metrologic.com) about the perimeters of the URL-encoded bar code symbol, in a similar way that UPC numbers are printed below UPC-type bar code symbols. This printing convention, once adopted, will help consumers determine which bar code symbols provide "Internet Access", in contrast with other types of bar code symbols.

In instances where the character string length of the URLs becomes long, particularly in connection with information resources that are stored in very-large Web-based database management systems (DBMS), it may be desirable to encode the URLs (to shorten their character string length) prior to encoding the URL within the bar code symbology being employed.

In the illustrative embodiments, the exemplary information resources have been indicated as being stored within WWW information servers, and thus, the URLs for such information resources have been included in the character substring "http://www." It is understood, however, that URL-encoded bar code symbols according to the present invention may also refer (i.e., point) to information resources stored on any type of Internet information server (e.g., a FTP information server) accessible through an Internet browser or communication program of an Internet Scanning Terminal of the present invention.

Also, in some embodiments of the present invention, it may be desirable to encode the URL of a particular information resource within two or more moderate-length bar code symbols, instead of within a single long-length bar code symbol, thereby allowing the use of shorter length bar code symbols on printed menus and lists.

Figure 9:
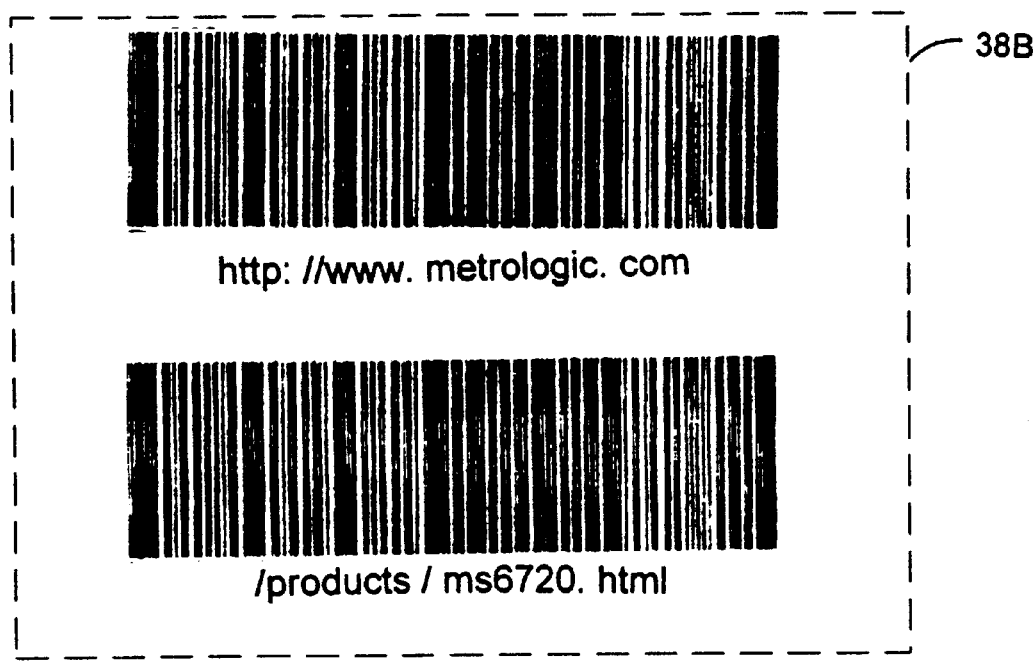
FIG. 9 is a graphical representation of an exemplary "multiple 1-D" URL-encoded bar code symbol structure according to the present invention, comprising a stack of discrete URL-encoded bar code symbols of Code 93 Symbology, encoded according to the principles of the present invention.

In such an embodiment illustrated in FIG. 9, the primary portion of the URL (e.g., "http://www.metrologic.com") identifying the location of the WWW Server can be encoded within a first bar code symbol, whereas the auxiliary portion of the URL (e.g., "/products/MS6720.html") indicating the location of the information resource (web pages) relative to the identified WWW Server can be encoded with a second bar code symbol. Internet Access to such an information resource could then be achieved in a two-step process, namely: (1) scan the first bar code symbol to access the home page of the WWW Server located by "http://www.metrologic.com"; and (2) scan the second bar code symbol to access the information resource located by "Products/MS6720/.html". Preferably, the primary and auxiliary segments of the URL would be printed below the first and second bar code symbols respectively, as shown in FIG. 9. This composite bar code symbol structure can be used during the menu composition process of the present invention as described in detail hereinabove.

The Internet Scanning Terminals and Bar Code Menu Composition System of the present invention may be modified, in a variety of ways, to carry out a diverse range of functions relating to various aspects of the present invention. All modifications and variations of the illustrative embodiments are deemed to be within the scope and spirit of the present invention as defined by the accompanying Claims to Invention.

What is claimed is:

1. A computer-based system for accessing and displaying Internet-based information resources stored in information servers on the Internet and composing sets of URL-encoded bar code symbols specifying the location of said Internet-based information resources on the Internet, said computer-based system comprising:

a computer system operably connectable to the Internet by way of an Internet Service Provider (ISP), and having a visual display screen and a data input device;

a Internet browser program, supported by said computer system, and enabling a user to access and display Internet-based information resources on said visual display screen, each said Internet-based information resource being stored on an information server connected to the Internet, and at a location specified by a Uniform Resource Locator (URL) defined on the Internet; and an application supported by said computer system, and enabling a user to compose a set of URL-encoded bar code symbols, each said URL-encoded bar code symbol being encoded with a URL specifying the location of one of said Internet-based information resources on the Internet;

wherein, during the operation of the Internet browser program, said application program allows the user to compile said set of URL-encoded bar code symbols for printing on a selected print medium, and wherein, after said set of URL-encoded bar code symbols are printed on said selected print medium, an Internet-based information resource specified by its URL-encoded bar code symbol set can be automatically accessed and displayed by reading the URL-encoded bar code symbol with a bar code symbol reader operably connected to an Internet-enabled computer system provided with a bar code driven Internet browser program.

2. The computer-based system of claim 1, wherein said application program comprises a plug-in type module for integration with said Internet browser program.

3. The computer-based system of claim 1, wherein said Internet-based information resources comprises a plurality of HTML-encoded documents.

4. The computer-based system of claim 1, wherein said set of URL-encoded bar code symbols further comprises, for each said URL-encoded bar code symbol listed in said set, one or more of the following information elements:
- a human-readable URL corresponding to said URL-encoded bar code symbol;
- a title description assigned to said URL-encoded bar code symbol;
- a brief description of the content of the Internet-based information resource specified by said URL-encoded bar code symbol;
- a date indicating when the Information-based information resource was last accessed and displayed by the composer of said set of URL-encoded bar code symbols.

5. The computer-based system of claim 1, wherein said application program comprises:
- a composing mode of operation during which said set of URL-encoded bar code symbols is composed; and
- an editing mode of operation during which said set of URL-encoded bar code symbols is edited.

6. The computer-based system of claim 5, wherein said application program further comprises a printing mode of operation during which said set of URL-encoded bar code symbols is printed on said selected print medium.

7. The computer-based system of claim 1, which further comprises a printer, operably connected to said computer system, for printing said set of URL-encoded bar code symbols on said selected print medium.

8. The computer-based system of claim 7, which further comprises
- a bar code symbol reader operably connected to said computer system, for reading one or more of URL-encoded bar code symbols on said set and automatically accessing and displaying the Internet-based information resources specified by said one or more of URL-encoded bar code symbols printed on said selected print medium.

9. The computer-based system of claim 8, wherein said visual display screen is realized by a visual display device.

10. The computer-based system of claim 8, wherein said data input device comprises a keyboard.

11. A method of accessing and displaying Internet-based information resources stored in information servers on the Internet and composing sets of URL-encoded bar code symbols specifying the location of said Internet-based information resources on the Internet, said method comprising the steps of:
(a) operably connecting a computer system to the Internet by way of an Internet Service Provider (ISP), said computer system having a visual display screen and a data input device, and supporting an Internet browser program and application program,
said Internet browser program enabling a user to access and display Internet-based information resources on said visual display screen, each said Internet-based information resources being stored on an information server connected to the Internet and at a location specified by a Uniform Resource Locator (URL) defined on the Internet, and
said application program enabling a user to compose a set of URL-encoded bar code symbols, each said URL-encoded bar code symbol being encoded with a URL specifying the location of said Internet-based information resource on the Internet;
(b) during the operation of the Internet browser program, using said application program to compile said set of URL-encoded bar code symbols for printing on a selected print medium; and
(c) after said set of URL-encoded bar code symbols is composed, printing said set of URL-encoded bar code symbols on said selected print medium.

12. The method of claim 11, which further comprises after step (c)
(d) accessing one or more Internet-based information resources specified by URL-encoded bar code symbols printed on said selected medium, by reading said URL-encoded bar code symbols using a bar code symbol reader operably connected to an Internet-enabled computer system provided with a bar code driven Internet browser program.

13. The method of claim 11, where during step (a) said application program comprises a plug-in type module for integration with said Internet browser program.

14. The method of claim 11, where during step (a) said Internet-based information resources comprise a plurality of HTML-encoded documents.

15. The method of claim 11, wherein step (b) comprises composing said set of URL-encoded bar code symbols such that, for each said URL-encoded bar code symbol listed in said set, one or more of the following information elements are included in said set:
- a human-readable URL corresponding to said URL-encoded bar code symbol;
- a title description assigned to said URL-encoded bar code symbol;
- a brief description of the content of the Internet-based information resource specified by said URL-encoded bar code symbol; and
- a date indicating when the Information-based information resource was last accessed and displayed by the composer of said set of URL-encoded bar code symbols.

16. The method of claim 11, wherein after step (b) but before step (c), said method further comprises:
editing said set of URL-encoded bar code symbols.

* * * * *